United States Patent
Wass et al.

(10) Patent No.: US 7,025,080 B2
(45) Date of Patent: Apr. 11, 2006

(54) CROSS OVER VALVE

(76) Inventors: Lloyd G. Wass, P.O. Box 39 (425 - 7th Ave.), Ironton, MN (US) 56455; Robert Venne, 609 - 1st St. SW., Crosby, MN (US) 56441

( * ) Notice: Subject to any disclaimer, the term of this patent is extended or adjusted under 35 U.S.C. 154(b) by 12 days.

(21) Appl. No.: 10/290,395

(22) Filed: Nov. 7, 2002

(65) Prior Publication Data

US 2003/0155008 A1    Aug. 21, 2003

Related U.S. Application Data

(60) Provisional application No. 60/337,770, filed on Nov. 13, 2001.

(51) Int. Cl.
F16K 15/20    (2006.01)
B63B 35/58    (2006.01)

(52) U.S. Cl. .......................... 137/223; 137/597; 441/41
(58) Field of Classification Search ............... 137/223, 137/597; 441/40, 41
See application file for complete search history.

(56) References Cited

U.S. PATENT DOCUMENTS

| | | | | |
|---|---|---|---|---|
| 1,576,555 | A | * | 3/1926 | Southmayd .................. 137/223 |
| 2,039,343 | A | * | 5/1936 | Prokul ......................... 137/223 |
| 2,364,211 | A | * | 12/1944 | Gustafson ..................... 441/41 |
| 2,444,717 | A | * | 7/1948 | Allen ........................... 441/41 |
| 3,550,652 | A | * | 12/1970 | Nimylowycz ................. 441/41 |
| 4,624,441 | A | * | 11/1986 | Kreitchman et al. ...... 251/30.01 |
| 5,725,024 | A | * | 3/1998 | Nimberger ................... 137/597 |
| 5,832,956 | A | * | 11/1998 | Nimberger ................... 137/597 |
| 5,868,155 | A | * | 2/1999 | Hutton ........................ 137/597 |
| 5,988,203 | A | * | 11/1999 | Hutton ........................ 137/597 |
| 6,176,262 | B1 | * | 1/2001 | Nimberger ................... 137/597 |

* cited by examiner

*Primary Examiner*—John Rivell
(74) *Attorney, Agent, or Firm*—Gray, Plant, Mooty, Mooty & Bennett, PA; Peter Forrest

(57) ABSTRACT

An improved cross over valve for use in conjunction with inflatable devices such as life rafts, escape slides, white water rafts, kayaks, etc. The invention is specifically a cross over valve for inflatable rafts and the like where the valve fluidly connects at least two separate compartments in the inflatable device thereby allowing inflation of the multiple compartments while also providing control of fluid flow therebetween.

12 Claims, 11 Drawing Sheets

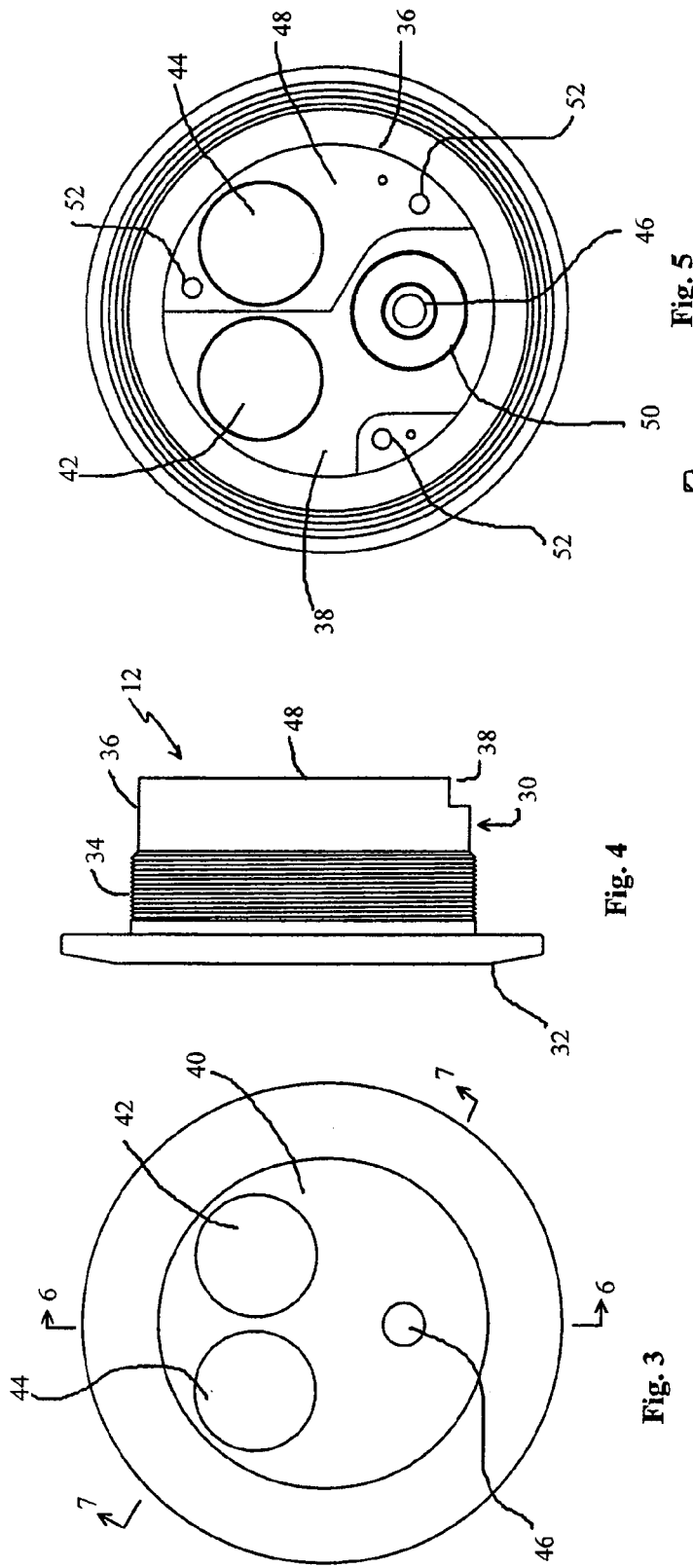

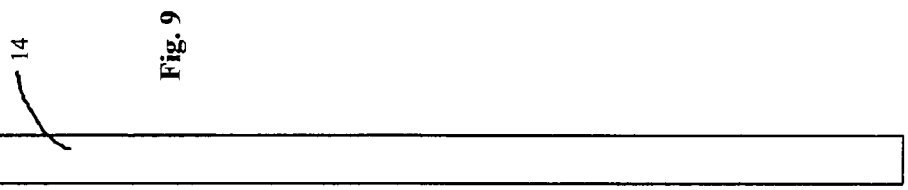
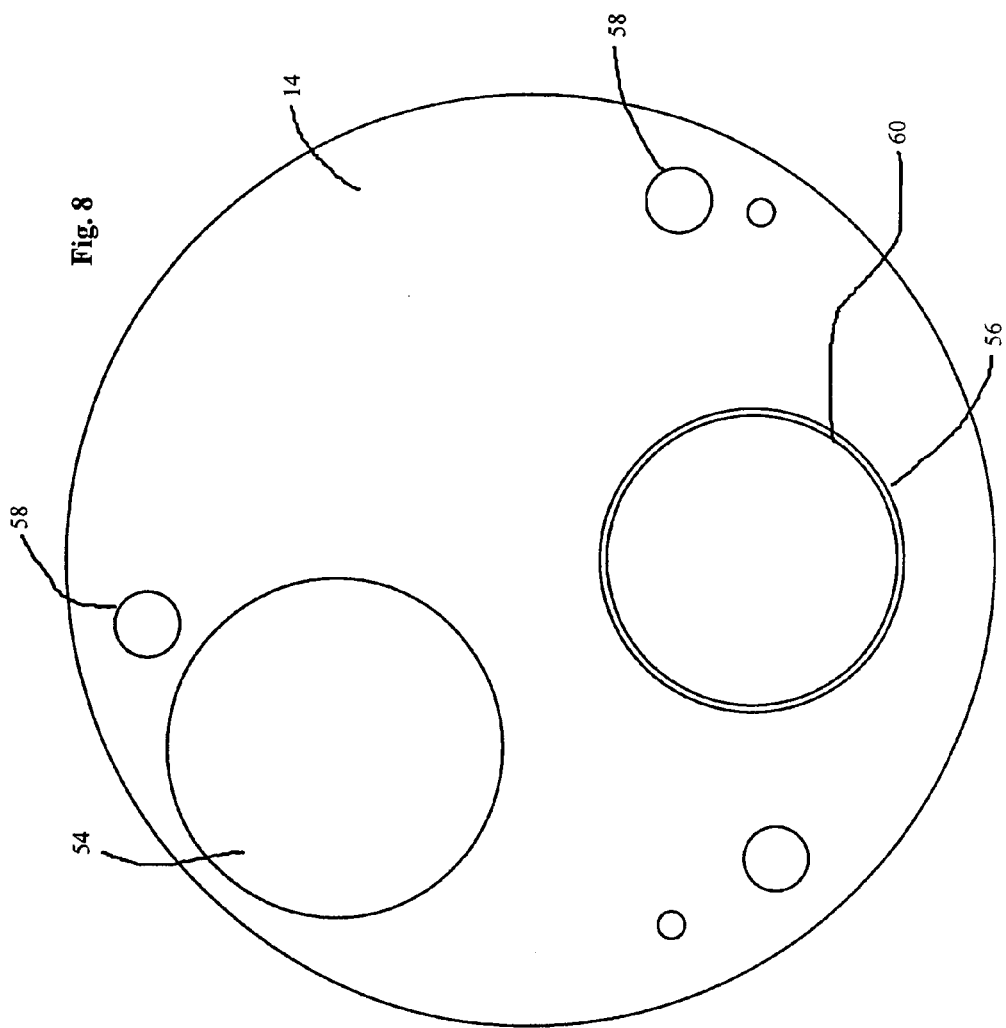

CROSS OVER VALVE

This application claims benefit of Provisional Application Ser. No. 60/337,770 filed Nov. 13, 2001.

BACKGROUND OF THE INVENTION

1. Technical Field

The invention relates to valves for inflatable device such life rafts, escape slides, white water rafts, kayaks, etc. and more particularly a cross over valve for inflatable rafts and the like where the valve fluidly connects at least two separate compartments in the inflatable device thereby allowing inflation of the multiple compartments while also providing control of fluid flow therebetween.

2. Background Information

For years, numerous different types of inflatable devices have been used for a variety of reasons. For instance, inflatable life rafts have been regularly provided on large aircrafts and water vessels for decades including those used by the military. These inflatable life rafts provide the necessary flotation vessels as would be needed by the passengers of the aircraft or water vessel should the aircraft crash or otherwise end up in water, or should the water vessel sink.

For safety reasons, and also in certain instances as required by law inflatable rafts for the military or civilian aircraft or watercraft use are formed of at least two distinct and separate inflatable chambers or compartments. These chambers remain completely separate so inflation thereof can be controlled, and so that deflation in the case of a rupture of one of tile compartments will not deflate the entire raft but only that one compartment. As a result, inflation valves and mechanisms, often called fill valves, are often provided for each and every compartment or chamber. This requires expensive, bulky equipment attached to each compartment.

SUMMARY OF THE INVENTION

The present invention is an improved valve assembly called a cross over valve assembly capable of controlled inflation of each compartment in an inflatable device coupled with a safety feature prohibiting deflation of all compartments when only one has a hole causing deflation thereof.

These objectives and advantages are obtained by the improved cross over valve of the present invention, the general nature of which may be stated as including a valve for interconnecting a first fluid compartment to a second fluid compartment in an inflatable device, the valve comprising a first plate in fluid communication with the environment and having a pair of valves therein capable of filling and pressure relieving whereby the first valve is in fluid communication with the first fluid compartment and the second valve is in fluid communication with the second fluid compartment, a second plate having a chamber designed to be in fluid communication with only the first valve; and an intercommunicating valve for providing a fluid passage that selectively fluidly connecting the second fluid valve with the chamber in the second plate.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 3 is a top view of the body portion or top plate of the cross over valve of FIG. 1;

FIG. 4 is a side view of the body as shown in FIG. 3;

FIG. 5 is a bottom view of the body as shown in FIG. 3;

FIG. 6 is a sectional view of the body taken along line 6—6 in FIG. 3;

FIG. 7 is a sectional view of the body taken along line 7—7 in FIG. 3;

FIG. 8 is top view of the intermediate plate of the cross over valve of FIG. 1;

FIG. 9 is a side view of the intermediate plate as shown in FIG. 8;

Similar numerals refer to similar parts throughout the drawings.

DESCRIPTION OF THE PREFERRED EMBODIMENT

Figure 1:
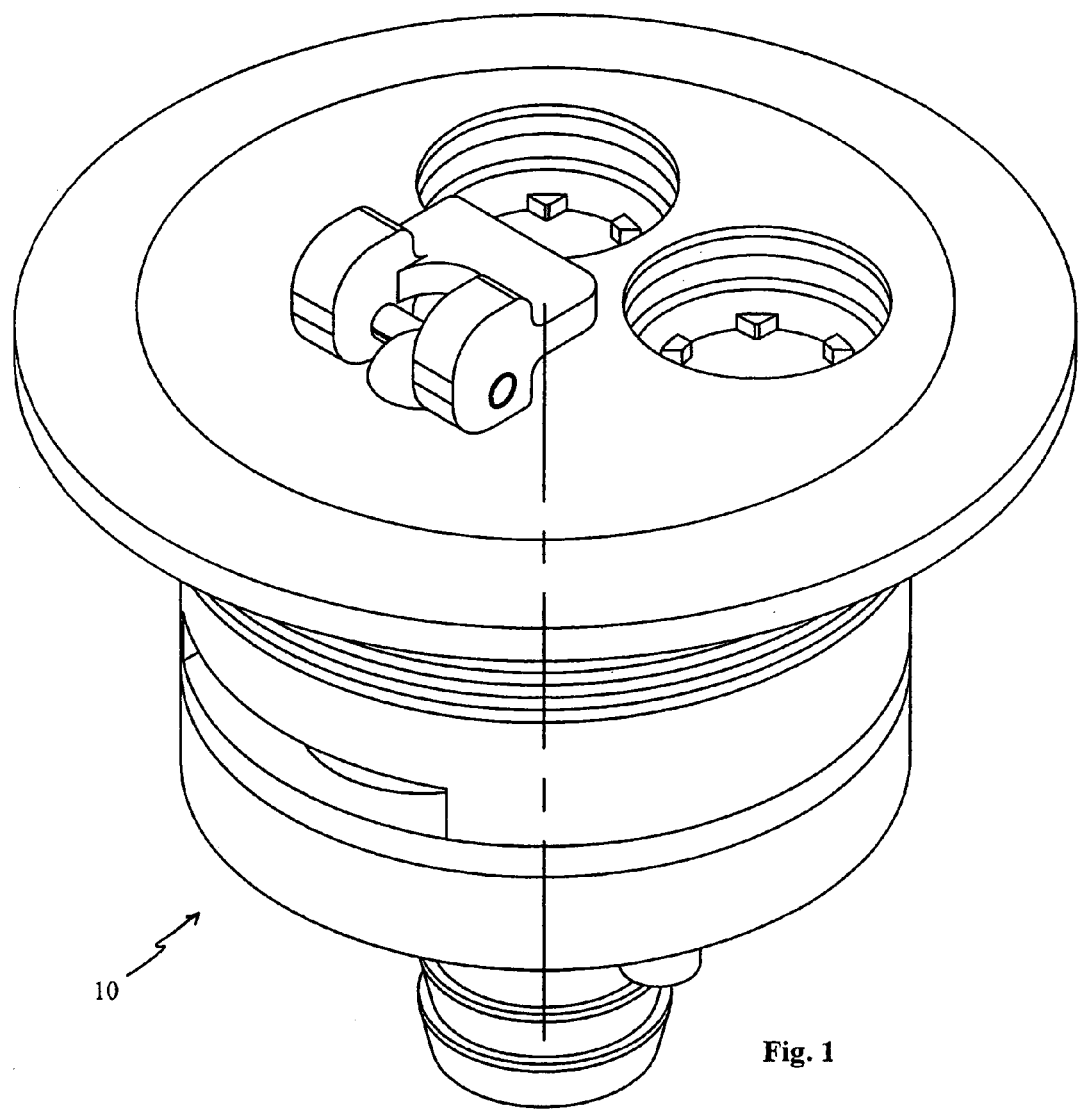
FIG. 1 is a perspective view of the present invention, namely a cross over valve.

The cross over valve assembly 10 for use in inflation devices such as life rafts, escape slides, white water rafts, kayaks, and the like is shown in the Figures. This cross over valve assembly 10 is adhered to the inflatable device via adhesive, glue, ultrasonic welding, mechanical clamp, or other methods known by one of skill in the art, where the inflatable device includes a plurality of compartments or chambers, such as for example a first compartment and a second compartment, each separated by a wall or bulkhead. Each of the raft sections or compartments includes an access port.

This improved cross over valve assembly 10 includes a valve body or top plate 12, an intermediate or center plate 14, a bottom plate 16, an intercommunicating valve 18, and a pair of hybrid topping and pressure relief valves 20 and 22.

Top plate 12 is best shown in FIGS. 3–7 where its general construction is that of a cylindrical body 30 with a flange-like head 32 at one end thereof. The outer surface of the cylindrical body 30 includes a threaded portion 34 and a smooth walled portion 36 with a notch 38 therein.

The top plate 12 has a top surface 40 from which the flange extends to define the flange-like head 32. A pair of large apertures or passageways 42 and 44 are positioned within the top surface 40 and the passages extend through the entire top plate 12 for receiving the hybrid topping and pressure relief valves. A small aperture 46 is also located in the top surface 40 and receives the shaft of the intercommunicating valve 18. Additional holes 52 are present for receipt of fasteners which hold the valve 10 together.

Opposite the top surface 40 of the top plate 12 is a base or bottom surface 48. The passageways 42 and 44 extend through the valve body 12 and exit in this bottom surface 48. The bottom surface 48 also includes an additional aperture 50 in which intercommunicating valve 18 is positioned.

Intermediate plate 14 is best shown in FIGS. 8–9 and includes a topping and relief valve fluid passage 54 and an intercommunicating valve aperture 56, as well as various holes 58 for receipt of fasteners which hold the valve 10 together. The intercommunicating valve aperture 56 includes a ridge, ledge or lip 60 therein. The intermediate plate may either be a metal plate whereby silicone or other sealants are used to seal it to the surrounding top plate 12 and bottom plate 16, or alternatively, the intermediate plate may be designed such that such that it is a metal insert with a rubber seal molded therearound.

Figure 12:
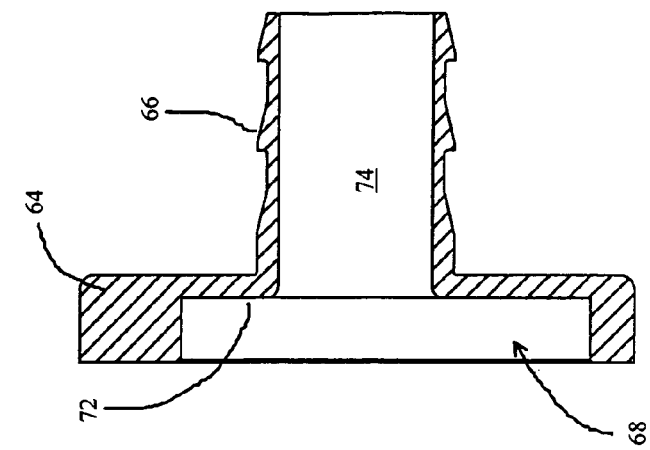
FIG. 12 is a cross sectional view of the bottom plate as shown in FIG. 10.
Figure 10:
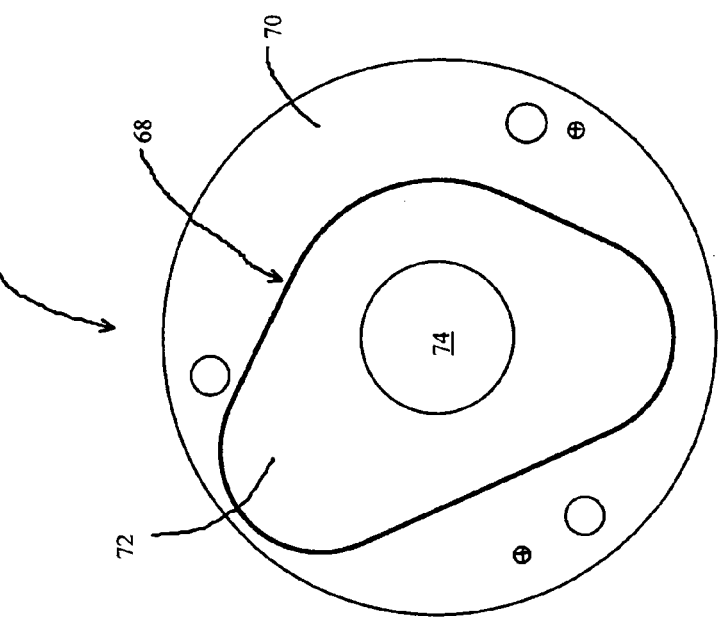
FIG. 10 is a top view of the bottom plate of the cross over valve of FIG. 1.
Figure 11:
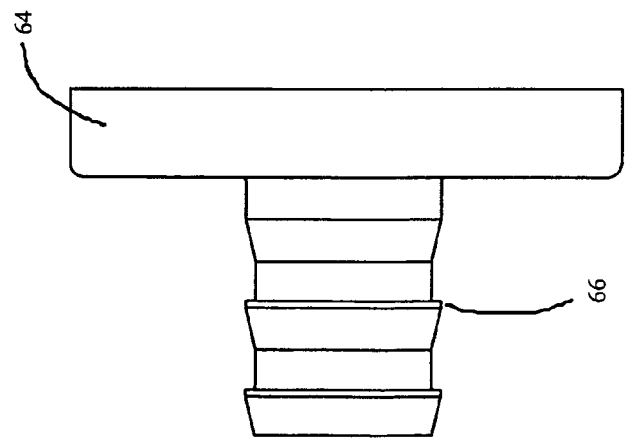
FIG. 11 is a side view of the bottom plate as shown in FIG. 10.

Bottom plate 16 is best shown in FIGS. 10–12 and includes a main body 64 with a hose barb 66 integrally connected and extending therefrom. Main body 64 includes a cut-out 68 open to a top surface 70 of the plate 16 and extending down to a recessed surface 72. A passageway or hole 74 extends from the recessed surface 72 into the barb and out the distal end thereof. The cut-out 68 is uniquely shaped to provide fluid flow from hole 64 to the passage 54 and the aperture 56 in intermediate plate 14 when it is adjacent to and in contact with the bottom plate 16 during assembly. The unique cut-out is shaped such that the entirety of each of the hole 64, passage 54 and aperture 56 have free flow into the cut-out.

Figure 13:
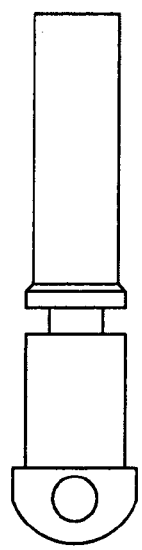
FIG. 13 is side view of the handle shaft of the cross over valve of FIG. 1.
Figure 14:
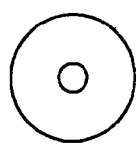
FIG. 14 is an end view of the handle shaft as shown in FIG. 13.
Figure 15:
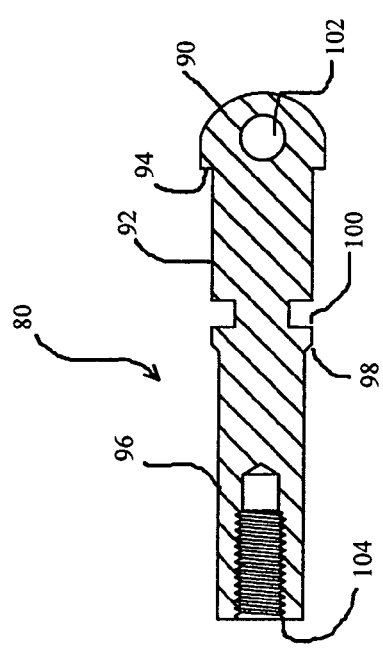
FIG. 15 is across sectional view of the handle shaft as shown in FIG. 13.
Figure 18:
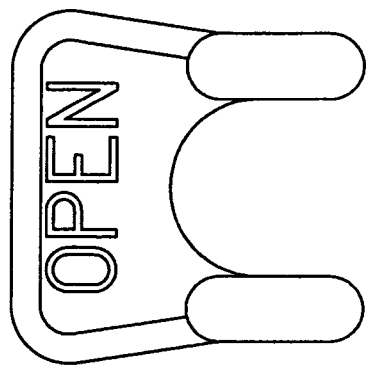
FIG. 18 is a second side view of the handle as shown in FIG. 16.
Figure 17:
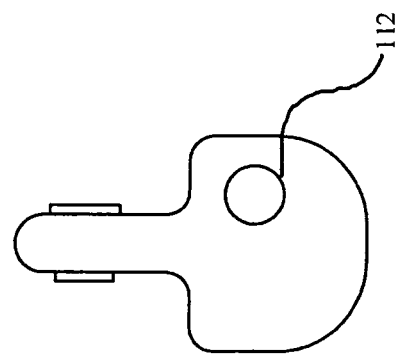
FIG. 17 is a side view of the handle as shown in FIG. 16.
Figure 16:
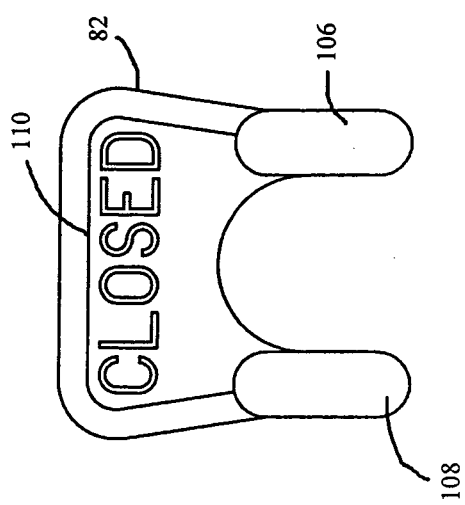
FIG. 16 is a first side view of the handle of the cross over valve of FIG. 1.

Intercommunicating valve 18 is best shown in FIGS. 13–20, and includes a pin 78, a shaft 80, a handle 82, a spring 84 and a head 86. The shaft is shown in FIGS. 13–15 to be an elongated shaft with a rounded head 90 stepped to a neck 92 via a lip 94, and an elongated cylindrical base 96 where a tapered surface 98 transitions the neck to the base. The neck having a circumferential groove 100 therein for receiving a seal. A slot 102 in the head receives the pin 78 during assembly. An axial threaded hole 104 is used by a fastener to secure the head 86 to the shaft. This shaft design is such that rotation is not necessary to open and close the valve since it is an axial motion valve—this results in the elimination of many sealing problems.

The handle 82 may be of any design capable of pulling or otherwise moving the shaft to adjust the intercommunicating valve from an open to a closed position. In the preferred embodiment, the handle 82 includes a pair of ears 106 and 108 connected by a planar gripping surface 110 which indicates open on one side and closed on the other side thereof. This is feasible because within the ears 106 and 108 is a hole 112 through which the pin pivotally connects the handle to the shaft. The hole is offset such that pivoting of the rounded ears against the top surface 40 causes the shaft to rise and fall. This design using ears that include flat spots on each side of the ear with a semi-circular curved radius therebetween also for a two position valve that is either open or closed.

Figure 20:
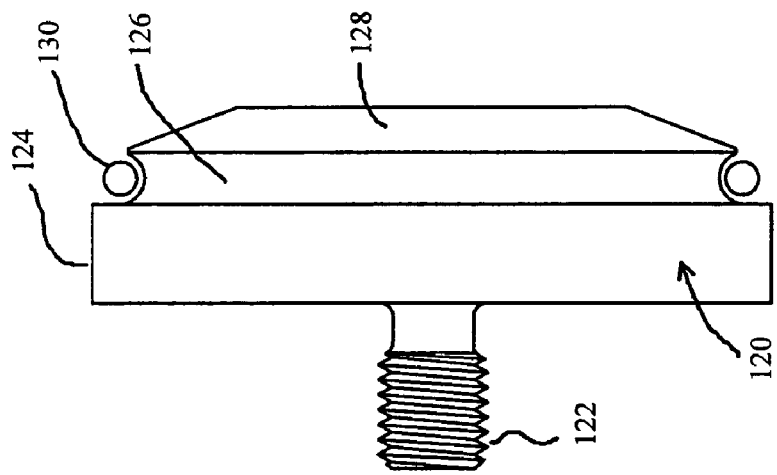
FIG. 20 is a side view of the cross over poppet as shown in FIG. 19.
Figure 19:
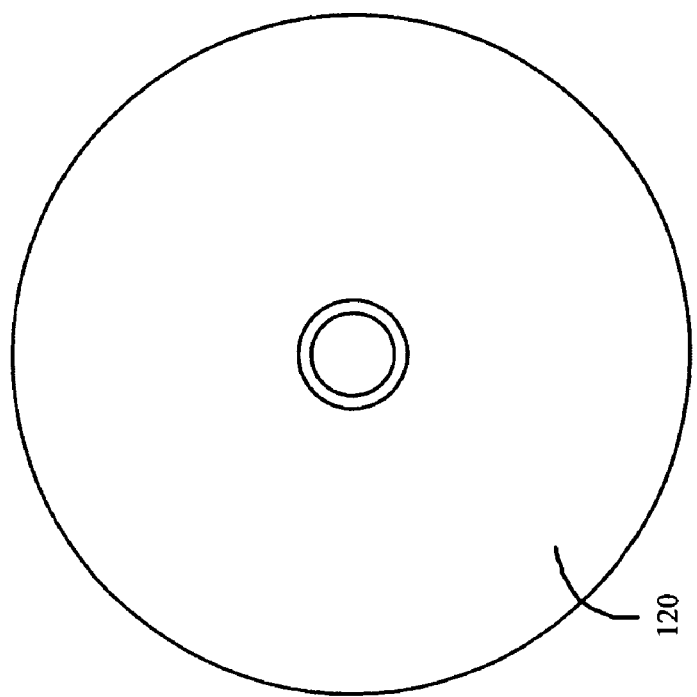
FIG. 19 is a top view of a first embodiment of a cross over poppet of the cross over valve of FIG. 1.

Poppet or head 86 is best shown in FIGS. 19–20 and includes a main head 120 with a threaded shaft 122 extending from a bottom surface thereof. The main head 120 includes a cylindrical portion 124 followed by a grooved portion 126 followed by a tapered head 128. The grooved portion is designed such that it will receive a seal 130.

In an alternative embodiment, the intermediate plate 14 is a metal plate with a seal rubber seal molded around it, and this main head 120 is designed as a head without the need for a seal and thus the grooved portion.

Figure 22:
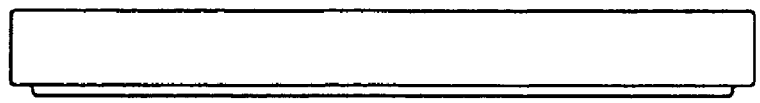
FIG. 22 is a side view of the retainer ring as shown in FIG. 21.
Figure 21:
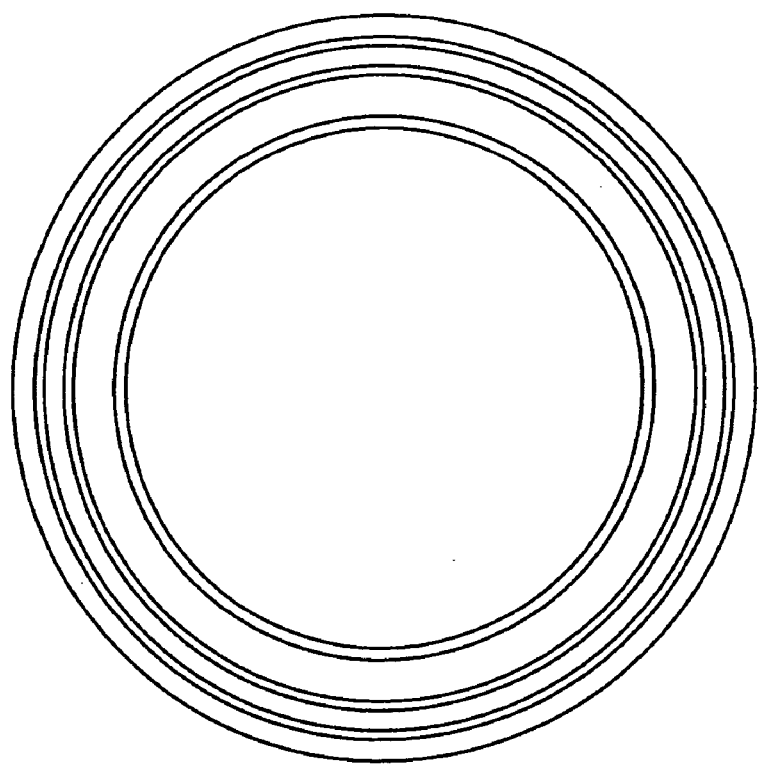
FIG. 21 is top view of a retainer ring of the cross over valve of FIG. 1.
Figure 23:
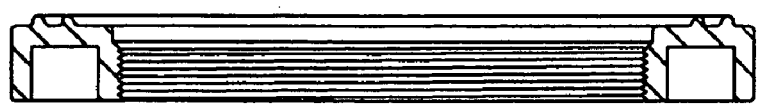
FIG. 23 is a cross sectional view of the retainer ring as shown in FIG. 21.
Figure 26:
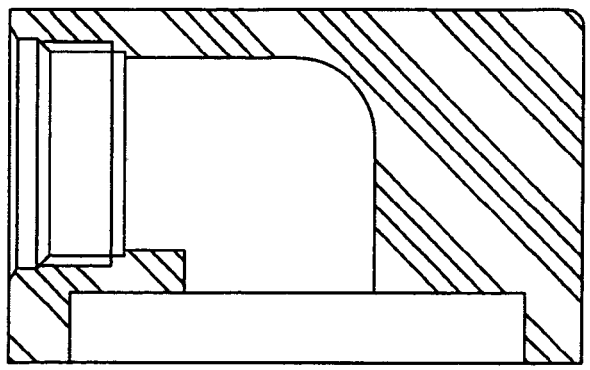
FIG. 26 is a cross sectional view of the body as shown in FIG. 25.
Figure 24:
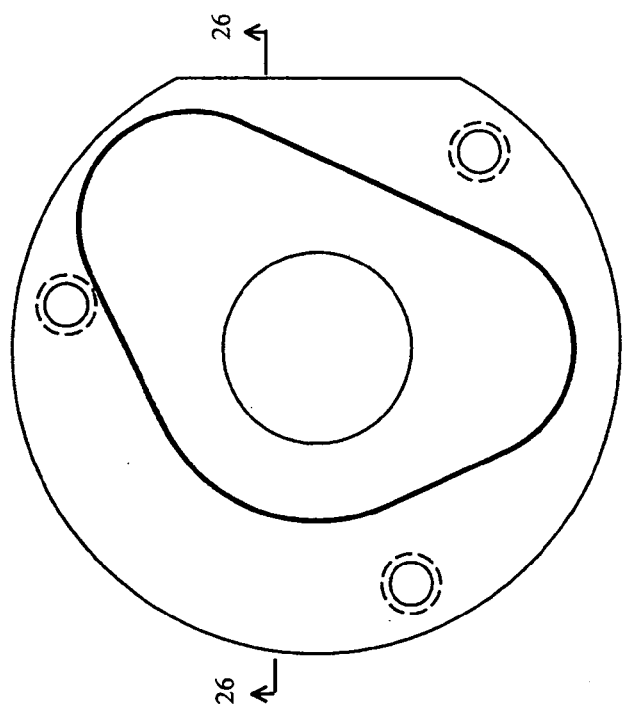
FIG. 24 is a top view of a second embodiment of a body for the cross over valve of FIG. 1.
Figure 27:
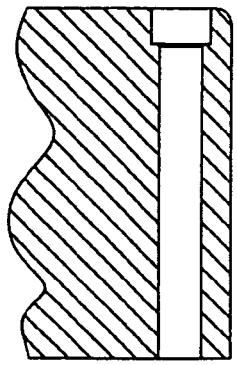
FIG. 27 is a sectional of the body taken along line 27—27 in FIG. 3.
Figure 25:
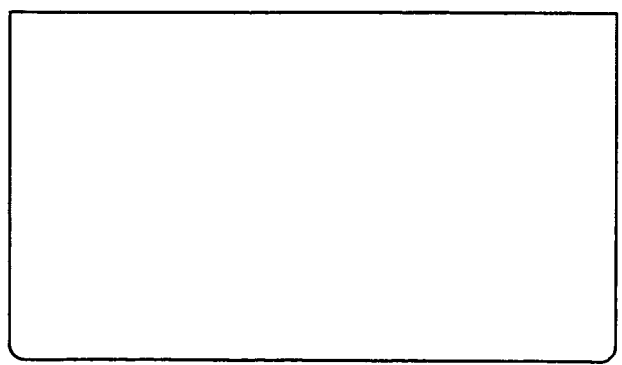
FIG. 25 is a side view of the body as shown in FIG. 24.

A retainer ring is shown in FIGS. 21–23.

Figure 28:
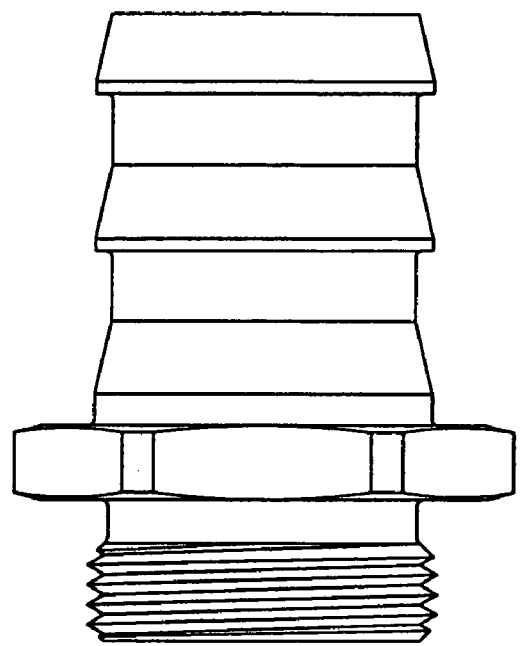
FIG. 28 is a side view of an alternative embodiment threaded hose barb that threads into a hole in the bottom plate rather than is integral therewith as in the first embodiment.
Figure 29:
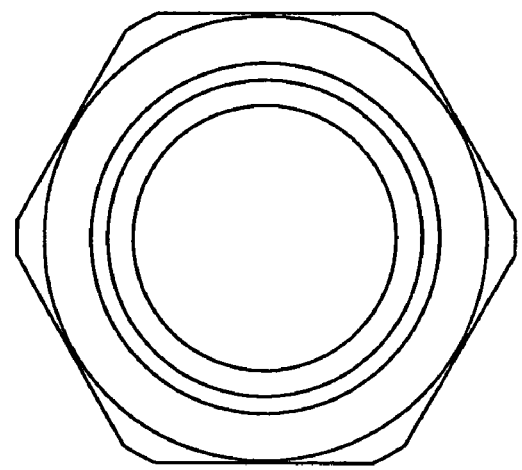
FIG. 29 is a top view of the hose barb of FIG. 28.

A different bottom plate embodiment is shown in FIGS. 24–27 where the hose barb is not integral to the plate, and instead is threaded into the plate. Also, in a yet even further alternative embodiment, the hose barb is threaded into the side of the plate as is shown rather than from the base of the plate. An available hose barb for these alternative embodiments is shown in FIGS. 28–29.

Figure 2:
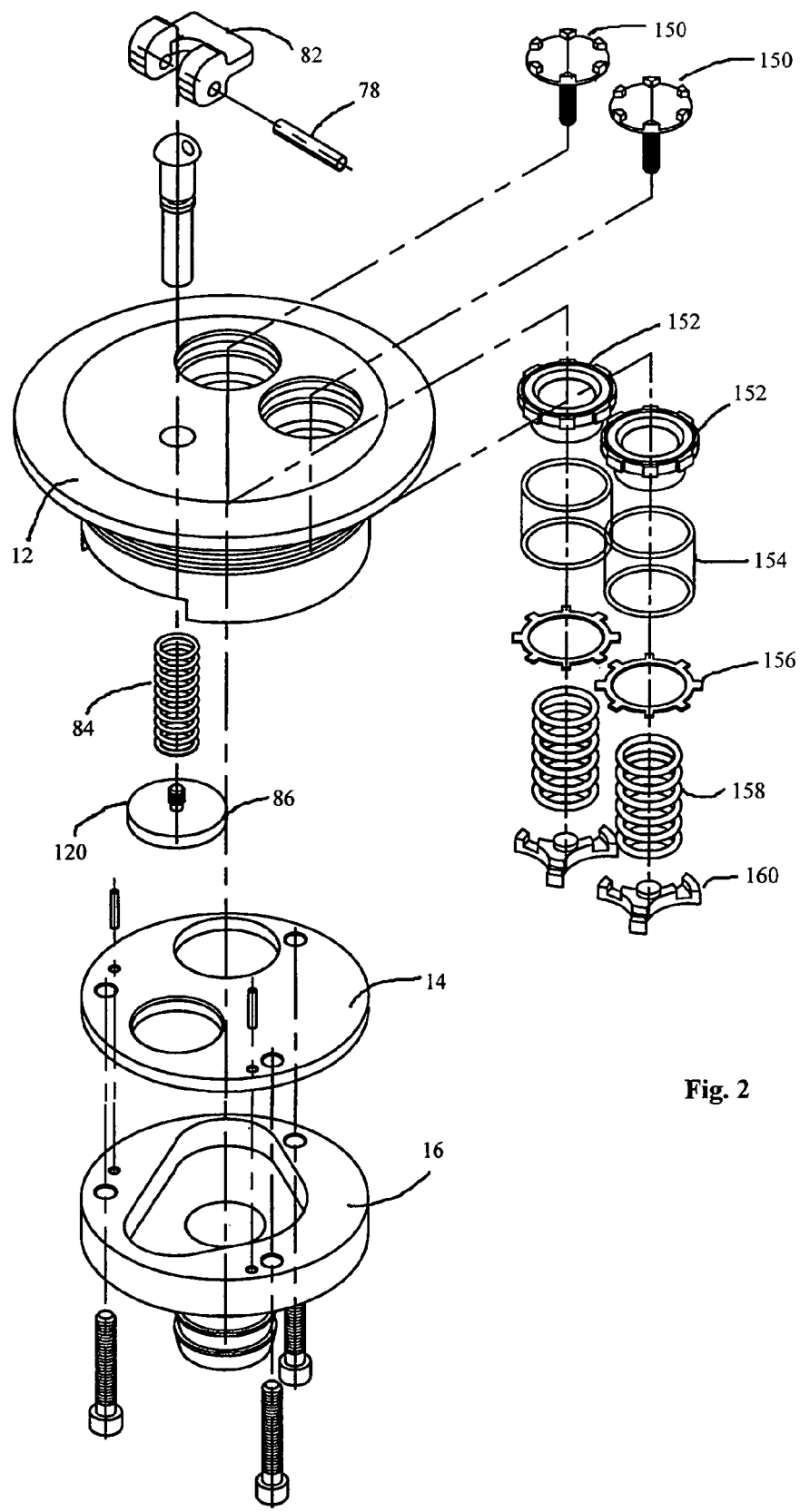
FIG. 2 is an exploded view of the cross over valve of FIG. 1.

Hybrid topping and pressure relief valves are provided as best shown in FIG. 2. These valves each include a poppet 150, a poppet seating body 152, a wave spring 154, a spring retainer or collar 156, a spring 158, and a retainer 160 and operate as explained in the recently filed patent application by Mirada Research & Manufacturing on a Hybrid Topping and Pressure Relief Valve, which is hereby incorporated by reference. In sum, poppet 150 has a flange with an underneath surface that seats within poppet seat 152 against a sealing face that is likely tapered. Spring 154 is sandwiched between collar 156 and the poppet seat 152 so as to bias these two apart from each other while poppet seat 152 is biased by the spring 154 against a lip in the passageway that prohibits the poppet seat from exiting the passageway along the top surface of the top plate 12. Spring 158 is inside of the poppet seat 152, wave spring 154 and collar 156 arrangement and sandwiched between the underneath surface of poppet 150 and retainer 160. Poppet 150 threads into the retainer 160 and holds the entire system together while collar 156 locks into a groove within one of the passageways 42 or 44 thereby holding the valve in place.

In operation, poppet 150 may dislodge from poppet seat 152 if sufficient pressure is placed against the underneath surface of poppet 150 to overcome the bias of spring 158. This is pressure relief mode. Alternatively, if sufficient pressure is placed against the top surface of the poppet 150, it overcomes the bias of spring 154 thereby compressing the spring such that poppet seat 152 is moved toward the retainer thereby allowing topping or filling fluid flow. All of this possible because the poppet and poppet seat are restricted within the passageways 42 and 44 by stops, namely stops that prohibit the poppet from further entering the passageways and stops that prohibit the poppet seat from further exiting from the passageways.

In use, the valve 10 is inserted, via an access port in an inflatable device, into a first chamber whereby a flexible hose is sealably and fluidly connected to a second chamber and attached to the hose barb on this valve. When filling is desired, compressed fluid is provided to either one of the topping valves. The pressure opens that particular valve and allows fluid to flow into the chamber fluidly connected thereto. In the case of the valves as shown in the drawings, the rightmost hybrid topping and pressure relief valve in aperture 42 is connected to the notch 38 such that the first chamber is filled (the chamber the valve is positioned within) while in the leftmost hybrid topping and pressure relief valve in aperture 44 is connected to the topping and relief valve fluid passage 54, the cut-out 68 and the hole 74 such that the second chamber is filled (the chamber the hose connects to).

Such topping or filling is performed by inserting pump end into the valve such that it pushes head 150 downward by overcoming the bias of spring 154. This unseals the poppet seat from its seated position within apertures 42 and 44. The compressed fluid may thus flow around the head and through passageways 42 and 44.

Similarly, pressure will be relieved from the chambers if the pressure therein exceeds the spring defined limit of the corresponding hybrid topping and pressure relief valve. In this situation, the pressure within the chamber must exceed the bias of spring 158 thereby causing pressure relief.

The invention uniquely allows for simultaneous filling of the first and second chambers from just one hybrid topping and pressure relief valve by opening the interconnecting valve 14. This also provides a unique feature in that the other valve then acts as a pressure relief valve should one try to overfill the inflation device.

Accordingly, the improved invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved invention is constructed and used, the characteristics of the construction, and the advantageous, new and useful results obtained; the new and useful structures, devices, elements, arrangements, parts and combinations, are set forth in the appended claims.

We claim:

1. A valve for interconnecting a first fluid compartment to a second fluid compartment in an inflatable device, the valve comprising:
    a first plate in fluid communication with the environment and having a pair of valves therein capable of filling and pressure relieving whereby the first valve is in fluid communication with the first fluid compartment and the second valve is in fluid communication with the second fluid compartment;
    a second plate having a chamber initially in fluid communication with only the first valve; and
    an intercommunicating valve for providing a fluid passage selectively fluidly connecting the second fluid valve with the chamber in the second plate;
in which the first plate includes a top surface defining a pair of large passageways for receiving the first and second valves and a small aperture for the intercommunicating valve.

2. The valve of claim 1, in which each of the first and second valves is a combined hybrid topping and pressure relief valve.

3. The valve of claim 1, further comprising an intermediate plate defining a topping and relief valve fluid passage and an intercommunicating valve aperture.

4. The valve of claim 1, in which the second plate defines a main body having a cut-out in a top surface of the main body, and a passageway extending from the cut-out to an external port on the valve.

5. The valve of claim 1, in which the intercommunicating valve comprises a pin, a shaft, a handle, a spring, and a head.

6. The valve of claim 1, in which each of the first and second valves is a hybrid topping and pressure relief valve comprising a poppet, a poppet seating body, a wave spring, a spring retainer, a spring, and a retainer.

7. A valve for interconnecting a first fluid compartment to a second fluid compartment in an inflatable device, the valve comprising:
    a top plate in fluid communication with the environment and having a pair of apertures with a pair of valves extending therethrough capable of filling and pressure relieving whereby the first valve is in fluid communication with the first fluid compartment and the second valve is in fluid communication with the second fluid compartment;
    a center plate;
    a bottom plate having a chamber initially in fluid communication with only the first valve; and
    an intercommunicating valve positioned within an additional aperture for providing a fluid passage that selectively fluidly connects the second fluid valve with the chamber in the second plate.

8. The valve of claim 7, in which the top plate comprises a top surface defining a pair of large passageways receiving the first and second valves, and an additional aperture through the top plate receiving the intercommunicating valve.

9. The valve of claim 7 in which the center plate defines a topping and relief valve fluid passage and an intercommunicating valve aperture.

10. The valve of claim 7 in which the bottom plate comprises a main body defining a cut-out in a top surface of the main body, and a passageway extending from the cut-out to an external port on the valve.

11. The valve of claim 7 in which the intercommunicating valve comprises a pin, a shaft, a handle, a spring and a head.

12. The valve of claim 7, in which each of the first and second valves is a hybrid topping and pressure relief valve comprising a poppet, a poppet seating body, a wave spring, a spring retainer, a spring, and a retainer.

* * * * *